US008682938B2

(12) United States Patent
Kilachand

(10) Patent No.: US 8,682,938 B2
(45) Date of Patent: Mar. 25, 2014

(54) SYSTEM AND METHOD FOR GENERATING PERSONALIZED SONGS

(75) Inventor: Jay Kilachand, New York, NY (US)

(73) Assignee: GiftRapped, LLC, New York, NY (US)

( * ) Notice: Subject to any disclaimer, the term of this patent is extended or adjusted under 35 U.S.C. 154(b) by 0 days.

(21) Appl. No.: 13/398,348

(22) Filed: Feb. 16, 2012

(65) Prior Publication Data

US 2013/0218929 A1 Aug. 22, 2013

(51) Int. Cl.
*G06F 17/30* (2006.01)

(52) U.S. Cl.
USPC ........... 707/804; 707/706; 707/736; 707/758; 707/802; 706/12; 706/14; 706/15; 705/16.1; 84/600

(58) Field of Classification Search
None
See application file for complete search history.

(56) References Cited

U.S. PATENT DOCUMENTS

| | | | | |
|---|---|---|---|---|
| 6,462,264 | B1 * | 10/2002 | Elam | 84/645 |
| 7,301,093 | B2 * | 11/2007 | Sater et al. | 84/615 |
| 7,365,260 | B2 * | 4/2008 | Kawashima | 84/600 |
| 8,244,546 | B2 * | 8/2012 | Nakano et al. | 704/500 |
| 2003/0159566 | A1 * | 8/2003 | Sater et al. | 84/615 |
| 2006/0123975 | A1 * | 6/2006 | Swanson | 84/600 |
| 2008/0091571 | A1 * | 4/2008 | Sater et al. | 705/26 |
| 2011/0219940 | A1 * | 9/2011 | Jiang | 84/622 |
| 2012/0254754 | A1 * | 10/2012 | Gentile et al. | 715/716 |

* cited by examiner

*Primary Examiner* — Hung Le
(74) *Attorney, Agent, or Firm* — Steptoe & Johnson LLP

(57) ABSTRACT

An integrated system of song personalization facilitates the customization of user song lyrics and the association of multimedia content with the lyrics to generate a personalized song. The system allows users to create personalized songs from song templates for different occasions, and the system further allows users to select multimedia content to be associated with specific sections of the song templates.

10 Claims, 3 Drawing Sheets

SYSTEM AND METHOD FOR GENERATING PERSONALIZED SONGS

TECHNICAL FIELD

The present invention is directed to a system and method for song personalization that facilitates the customization of a song and associates selected multimedia content to be displayed during specific portions of the song.

BACKGROUND

Music, by some, is considered to be a universal language that comes in many forms and expressions. Songs can make us laugh, cry, and inspire us in our everyday lives. Songs can be uplifting, instructive, or can be created simply to make everyone have a good time. Songs also are used to identify things that we love or affiliate ourselves with. For example, universities have school songs, countries have national anthems, and certain holidays are associated with songs that people have grown to love.

For various occasions, such as birthdays or other monumental life events, an individual may wish to create a personalized song for the particular occasion to give as a gift. However, the average person may not be gifted with the ability to create a fun, moving, pleasing, catchy, etc., song that people will enjoy. Thus, it may be desirable to create a way in which someone can efficiently create an entire song without requiring the person come up with every lyric on his or her own. Accordingly, a computer-implemented system that allows users to quickly and efficiently create such personalized songs may be useful. Once a personalized song is generated, it may also be desirable for the computer-implemented system to also facilitate the sharing of the personalized song with others via email messages, mobile messages and/or social network applications.

SUMMARY

A song personalization system and method generates personalized songs, incorporating multimedia content such as audio, image and/or video files, customized by users from song templates for different occasions. The song personalization system may be equipped to display lyrics of a template file to a user that may be customized to suit the user's needs. The system may retrieve template files from a song repository and associate selected text with specific song lines to create a user-customized template file. The system may also allow a user to associate multimedia content, such as images, video content, or other audio content, with specific sections of the user-customized template file. The song personalization system can compile the user-customized template file and multimedia content to generate a song file that encompasses a final personalized song.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The details of one or more embodiments are set forth in the following detailed description of the invention and the accompanying drawings. Other objectives, features, and advantages of the invention will be more readily understood upon consideration of the following Detailed Description of the invention, taken in conjunction with the accompanying drawings, and with the claims.

DESCRIPTION OF THE DRAWINGS

The present invention is further described in the detailed description which follows, in reference to the noted plurality of drawings by way of non-limiting examples of certain embodiments of the present invention, in which like numerals represent like elements throughout the several views of the drawings, and wherein.

DETAILED DESCRIPTION OF EXEMPLARY EMBODIMENTS

A detailed explanation of the system and method according to the preferred embodiments of the present invention are described below.

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable, instructions embodied on one or more computer-readable media.

The various song personalization techniques, methods, and systems described herein can be implemented in part or in whole using computer-based systems and methods. Additionally, computer-based systems and methods can be used to augment or enhance the functionality described herein, increase the speed at which the functions can be performed, and provide additional features and aspects as a part of or in addition to those described elsewhere in this document. Various computer-based systems, methods and implementations in accordance with the described technology are presented below.

Figure 1:
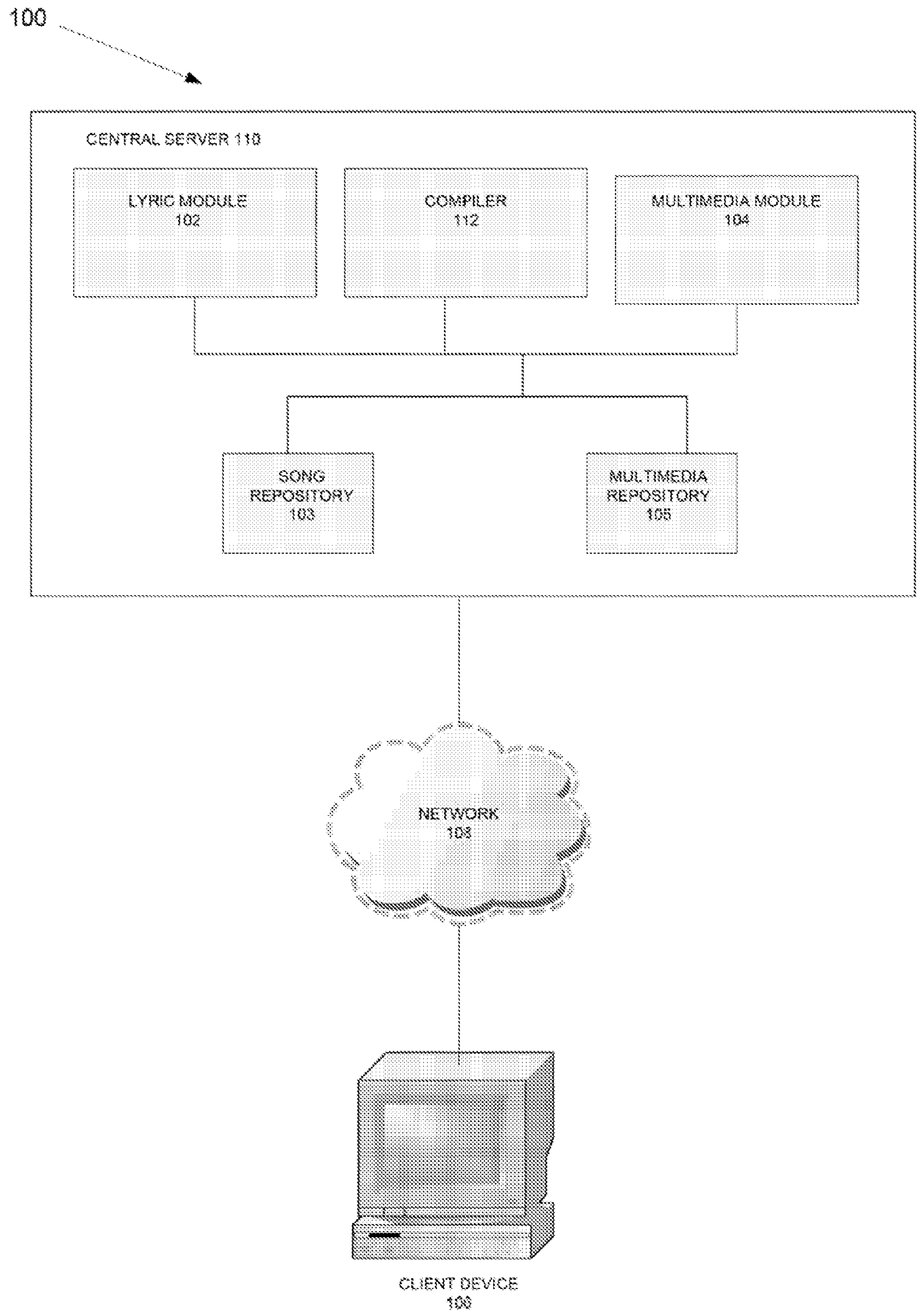
FIG. 1 illustrates an exemplary song personalization system and its components consisting therein.

Referring to the song personalization system 100 shown in FIG. 1, in an embodiment, the centralized server 110, the client device 106, lyric module 102, multimedia module 104, song repository 103, multimedia repository 105, and/or compiler 112 may comprise a general-purpose computer and can have an internal or external memory for storing data and programs such as an operating system (e.g., DOS, Windows 2000™, Windows XP™, Windows NT™, OS/2, UNIX or Linux) and one or more application programs. Examples of application programs include computer programs implementing the techniques described herein for lyric and multimedia customization, authoring applications (e.g., word processing programs, database programs, spreadsheet programs, or graphics programs) capable of generating documents or other electronic content; client applications (e.g., an Internet Service Provider (ISP) client, an e-mail client, or an instant messaging (IM) client) capable of communicating with other computer users, accessing various computer resources, and viewing, creating, or otherwise manipulating electronic content; and browser applications e.g.,.(Microsoft's Internet Explorer) capable of rendering standard Internet content and other content formatted according to standard protocols such as the Hypertext Transfer Protocol (HTTP). One or more of the application programs can be installed on the internal or external storage of the general-purpose computer. Alternatively, in another embodiment, application programs can be externally stored in or performed by one or more device(s) external to the general-purpose computer. In an embodiment, the lyric module 102, multimedia module 104, or the compiler 112 may be an application program.

In addition, client device 106 may be or can include a desktop computer, a server, a laptop computer or other mobile computing device, a network-enabled cellular telephone (with or without media capturing/playback capabilities), wireless email client, or other client, machine or device to perform various tasks including Web browsing, search, electronic mail (email) and other tasks, applications and functions. Client device 106 may additionally be any portable media device such as digital still camera devices, digital video cameras (with or without still image capture functionality), media players such as personal music players and personal video players, and any other portable media device.

The general-purpose computer may include a central processing unit (CPU) for executing instructions in response to commands, and a communication device for sending and receiving data. One example of the communication device is a modem. Other examples include a transceiver, a communication card, a satellite dish, an antenna, a network adapter, or some other mechanism capable of transmitting and receiving data over a communications link through a wired or wireless data pathway.

The general-purpose computer may also include an input/output interface that enables wired or wireless connection to various peripheral devices. Examples of peripheral devices include, but are not limited to, a mouse, a mobile phone, a personal digital assistant (PDA), a keyboard, a display monitor with or without a touch screen input, and an audiovisual input device. In another implementation, the peripheral devices may themselves include the functionality of the general-purpose computer. For example, the mobile phone or the PDA may include computing and networking capabilities and function as a general purpose computer by accessing a network and communicating with other computer systems. Examples of a network, such as network 108, include the Internet, the World Wide Web, WANs, LANs, analog or digital wired and wireless telephone networks (e.g., Public Switched Telephone Network (PSTN), Integrated Services Digital Network (ISDN), and Digital Subscriber Line (xDSL)), radio, television, cable, or satellite systems, and other delivery mechanisms for carrying data. A communications link can include communication pathways that enable communications through one or more networks.

In one implementation, a processor-based system of the general-purpose computer can include a main memory, preferably random access memory (RAM), and can also include a secondary memory. The secondary memory can include, for example, a hard disk drive or a removable storage drive, representing a floppy disk drive, a magnetic tape drive, an optical disk drive (Blu-Ray, DVD, CD drive), magnetic tape, paper tape, punched cards, standalone RAM disks, Iomega Zip drive, etc. The removable storage drive can read from or write to a removable storage medium. A removable storage medium can include a floppy disk, magnetic tape, optical disk (Blu-Ray disc, DVD, CD) a memory card (CompactFlash card, Secure Digital card, Memory Stick), paper data storage (punched card, punched tape), etc., which can be removed from the storage drive used to perform read and write operations. As will be appreciated, the removable storage medium can include computer software or data.

In alternative embodiments, the secondary memory can include other similar means for allowing computer programs or other instructions to be loaded into a computer system. Such means can include, for example, a removable storage unit and an interface. Examples of such can include a program cartridge and cartridge interface (such as the found in video game devices), a removable memory chip (such as an EPROM or PROM) and associated socket, and other removable storage units and interfaces, which allow software and data to be transferred from the removable storage unit to the computer system.

In one embodiment, network 108 can also include a communications interface that allows software and data to be transferred between client device 106, central server 110, and the other components shown in system 100. The lyric module 102, multimedia module 104, song repository 103, multimedia repository 105, and compiler 112 may also be stand-alone components that can communicate with each other, the centralized server 110, and/or the client device over network 108. Examples of communications interfaces can include a modem, a network interface (such as, for example, an Ethernet card), a communications port, and a PCMCIA slot and card. Software and data transferred via a communications interface may be in the form of signals, which can be electronic, electromagnetic, optical or other signals capable of being received by a communications interface. These signals may be provided to a communications interface via a channel capable of carrying signals and can be implemented using a wireless medium, wire or cable, fiber optics or other communications medium. Some examples of a channel can include a phone line, a cellular phone link, an RF link, a network interface, and other suitable communications channels.

In this document, the terms "computer program medium" and "computer readable medium" are generally used to refer to media such as a removable storage device, a disk capable of installation in a disk drive, and signals on a channel. These computer program products may provide software or program instructions to a computer system.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, DVD, holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Computer programs which may be associated with applications of the lyric and multimedia modules 102 and 104 (also called computer control logic) may be stored in the main memory or secondary memory. Such computer programs can also be received via a communications interface. Such computer programs, when executed, may enable the computer system to perform the features as discussed herein. In particular, the computer programs, when executed, may enable the processor to perform the described techniques. Accordingly, such computer programs may represent controllers of the computer system.

In an embodiment where the elements are implemented using software, the software can be stored in, or transmitted via, a computer program product and loaded into a computer system using, for example, a removable storage drive, hard drive or communications interface. The control logic (software), when executed by the processor, may cause the processor to perform the functions of the techniques described herein.

In another embodiment, the elements may be implemented primarily in hardware using, for example, hardware components such as PAL (Programmable Array Logic) devices, application specific integrated circuits (ASICs), or other suitable hardware components. Implementation of a hardware state machine so as to perform the functions described herein will be apparent to a person skilled in the relevant art(s). In yet another embodiment, elements may be implanted using a combination of both hardware and software.

In another embodiment, the computer-based methods can be accessed or implemented over the World Wide Web by providing access via a Web Page to the methods described herein.

Accordingly, the Web Page may be identified by a Universal Resource Locator (URL). The URL may denote both a server and a particular file or page on the server. In this embodiment, it is envisioned that a client computer system, which may be the client device 106, may interact with a browser to select a particular URL, which in turn may cause the browser to send a request for that URL or page to the server identified in the URL. Typically, the server may respond to the request by retrieving the requested page and transmitting the data for that page back to the requesting client computer system, which may be the client device 106 (the client/server interaction may be typically performed in accordance with the hypertext transport protocol or HTTP). The selected page may then be displayed to the user on the client's display screen. The client can then cause the server containing a computer program to launch an application, for example, to perform an analysis according to the described techniques. In another implementation, the server can download an application to be run on the client to perform an analysis according to the described techniques.

Referring to FIG. 1, the song personalization system 100 may comprise a centralized server 110, a lyric module 102, a multimedia module 104, a song repository 103, a multimedia repository 105, a compiler 112, a client device 106, and network 108. In an embodiment, one or more of the lyric module 102, multimedia module 104, song repository 103, multimedia repository 105, and compiler 112 may be integrated within each other, the centralized server 110, or the client device 106. For example, the lyric module 102 and multimedia module 104 may be the same module. In another example, song repository 103 and the multimedia repository 105 may be the same repository or located within the same database. In yet another example, the lyric module 102 and multimedia module 104 may be application programs downloaded as part of a mobile application to client device 106. In such example, the lyric module 102 and multimedia module 104 may communicate to the other components in the system 100 over network 108. In another embodiment, one or more of the lyric module 102, multimedia module 104, song repository 103, multimedia repository 105, and compiler 112 may be stand-alone components that can communicate with each other, the centralized server 110, and/or the client device 106 over network 108.

The song repository 103 may, be a repository, such as a database, which serves as a storage location for template files used to generate personalized songs. The template files may be multimedia files that include audio, video, and/or text data. For example, the multimedia file may be an audio file that includes instrumentals and vocals. In another example, the multimedia file may be a text file that solely includes lyrics. In either event, a template file may include a template of a song with a set of lyrics already included in the file. The template file may also include sections of the song that are left open for a user to insert selected text. For example, a template file may include an incomplete song with gaps or spaces for the user to enter selected text in order to complete the song. The template files stored in the song repository 103 may be categorized by occasion, theme, musical genre, artist, album, or any other type of category.

In an embodiment, a predetermined set of template files may be stored in the song repository 103. In such an embodiment, if a user wishes to utilize more template files than this predetermined set, the user may be able to purchase additional template files. Upon purchase of the additional template files, these files may be uploaded into the song repository 103. In another embodiment, the entire universe of template files may already be located within the song repository 103. In such an embodiment, the user may be able to access certain template files upon purchasing the access rights to the template files. In another embodiment, the song repository 103 may contain template files created by individual users, which may be accessed by other users. In such an embodiment, a user may upload a template file that he or she has created from a client device 106, for example, to the song repository 103 over the network 108.

The multimedia repository 105 may be a repository, such as a database, which serves as a storage location for multimedia files including audio, image, and/or video content. The multimedia files may be retrieved and associated with a personalized song during playback of the song. For example, an image may be and presented to a user during playback of a specific portion of a song designated by the user.

In an embodiment, a predetermined set of multimedia files may be stored in the multimedia repository 105. If a user wishes to utilize more multimedia files than this predetermined set, the user may be able to purchase additional multimedia files. Upon purchase of the additional multimedia files, these files may be uploaded into the multimedia repository 105. In another embodiment, the entire universe of multimedia files may already be located within the multimedia repository 105. In such embodiment, the user may be able to access certain multimedia files upon purchasing the access rights to the multimedia files. In another embodiment, the multimedia repository 105 may contain multimedia files taken or created by individual users, which may be accessed by other users. In such an embodiment, a user may upload a multimedia file from a client device 106, for example, to the multimedia repository 105 over the network 108. In yet another embodiment, the multimedia repository 105 may be a database located on a user's client device, or may be a database that is part of a social networking website or other website.

The lyric module 102 and the multimedia module 104 may be utilized to assist a user in creating a personalized song. For example, a user can use client device 106 to send a request to the lyric module 102 to select a template file for creating a personalized song. A user may select a template file based on how the template file is categorized within the song repository 103. For example, the user may select a template file based on occasion, theme, musical genre, artist, album, or any other type of category. Once the user selects a template file, the lyric module 102 may communicate with the song repository 103 to retrieve the template file.

The lyric module 102 may then display the song lyrics of the retrieved template file to the user on the client device 106. The template file may include a predetermined set of lyrics for a song with one or more blank spaces for the user to enter selected text. In an embodiment, the user can manually type selected text that he/she wishes to enter into the blank spaces. In another embodiment, the client device 106 may be equipped with speech-recognition technology to allow the user to speak his or her selected text. Once the user provides his or her selected text, the lyric module 102 may associate the selected text with the blank spaces of the song included in the template file. In an embodiment, the lyric module 102 can associate the selected text with the template file by entering the selected text into the blank spaces to create a new, user-customized template file.

In an embodiment, a user may choose to select particular multimedia files to be displayed during specific sections of the song from the desired template file. A user can use client device 106 to send a request to the multimedia module 104 to select and retrieve one or more multimedia files from the multimedia repository 105. The multimedia module 104 may associate the selected multimedia files with specific sections of the song designated by the user. For example, if an image is selected and associated with a particular section of a personalized song, the image can be displayed during playback of the song at the designated section. In an embodiment, the multimedia module 104 can associate the selected multimedia files with designated sections of the song included in the aforementioned user-customized template file.

In another embodiment, the song personalization system 100 may provide a mechanism to allow for the generation of a preview version of the personalized song before a final version of the, song is created. For example, lyric module 102 and/or the multimedia module 104 may generate a preview version of the personalized song prior to compiling the selected text and multimedia data to create the final personalized song. In an embodiment, the preview version may comprise the instrumentals and the vocals of the personalized song. The playback of the preview version of the personalized song may also include subtitles of the text of the lyrics.

Once the user is ready to create the final personalized song, the template file and the associated selected text may be transmitted along with the selected multimedia data to the compiler 112. In an embodiment, this would involve transmitting the user-customized template file along with the selected multimedia data to the compiler 112. In an embodiment, the compiler 112 is located at the central server 110. The compiler 112 can compile the template file, selected text, user-customized template file, and/or the multimedia data into a song file to create the final personalized song. The song file that is created may comprise the final personalized song that can include the vocals, instrumentals, multimedia data, and/or subtitles that were previously associated and compiled with the template file. A user may download the generated song file to the user's client device 106. In another embodiment, the generated song file can be played from the central server 110. In yet another embodiment, a user may also share the generated song file with others via email messages, mobile messages and/or social network applications.

Figure 2:
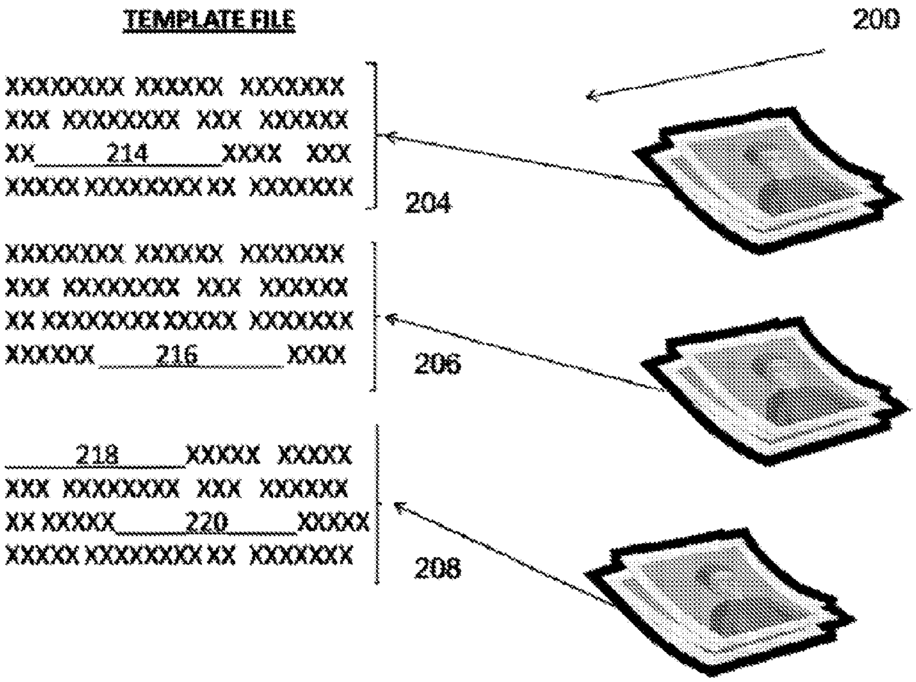
FIG. 2 illustrates an exemplary representation of how a template file can be customized.

Referring to FIG. 2, according to an embodiment, the song personalization system 100 may initiate the customization of lyrics via the lyric module 102, which associates selected text with specific song lines. Specifically, the song personalization system 100 may allow a user to select a desired template file and walk the user through the process of creating a personalized song from the template file.

The lyric module 102 may display to the user the portions of the lyrics of a song which are customizable. For example, the lyric module 102 may generate an interface to display the text 200 of the song from the template file to the user, and may utilize blanks spaces in the text, such as spaces 214, 216, 218, and 220, to indicate the portions that can be customized. The user can select text to be inserted into the blank spaces of the template file. In an embodiment, the user may type in his or her selected text in the blank spaces. In another embodiment, the user may use a microphone to speak his or her selected text into the blank spaces. The lyric module 102 may move on to each blank space in the set of lyrics until the user enters selected text for each blank space. When the user selects text to customize these specific blank spaces, the lyric module 102 may associate the selected text with the template file. In an embodiment, the lyric module 102 can associate the selected text with the template file, by entering the selected text into the blank spaces to create a new, user-customized template file.

In yet another embodiment, a user may choose and the multimedia module 104 may facilitate the association of particular multimedia files, such as image files 202, 210, and 212, with specific sections of the song from the template file, such as sections 204, 206, and 208. Upon selection of the image files, the, multimedia module 104 can associate the image files with the respective designated sections. The multimedia module 104 may update the template file with the associated image data accordingly. In another embodiment, the multimedia module 104 may update the new, user-customized template file with the associated image data. Alternatively, the user may choose to associate video data or other audio data with the designated sections 204, 206, and 208 of the song. Once the selected text and multimedia data have been associated with the template file or user-customized template, the template file or user-customized template file, along with the selected text and/or the selected multimedia data can be transmitted to the compiler 112 to create the final personalized song.

In another aspect of the invention, a user may also compose an introductory message to be incorporated with the personalized song. For example, on the client device 106, the user may vocally record an introductory message that can be associated with the template file or user-customized template file in creating the personalized song. The introductory message can then be compiled with the other selected data in creating the final personalized song.

Figure 3:
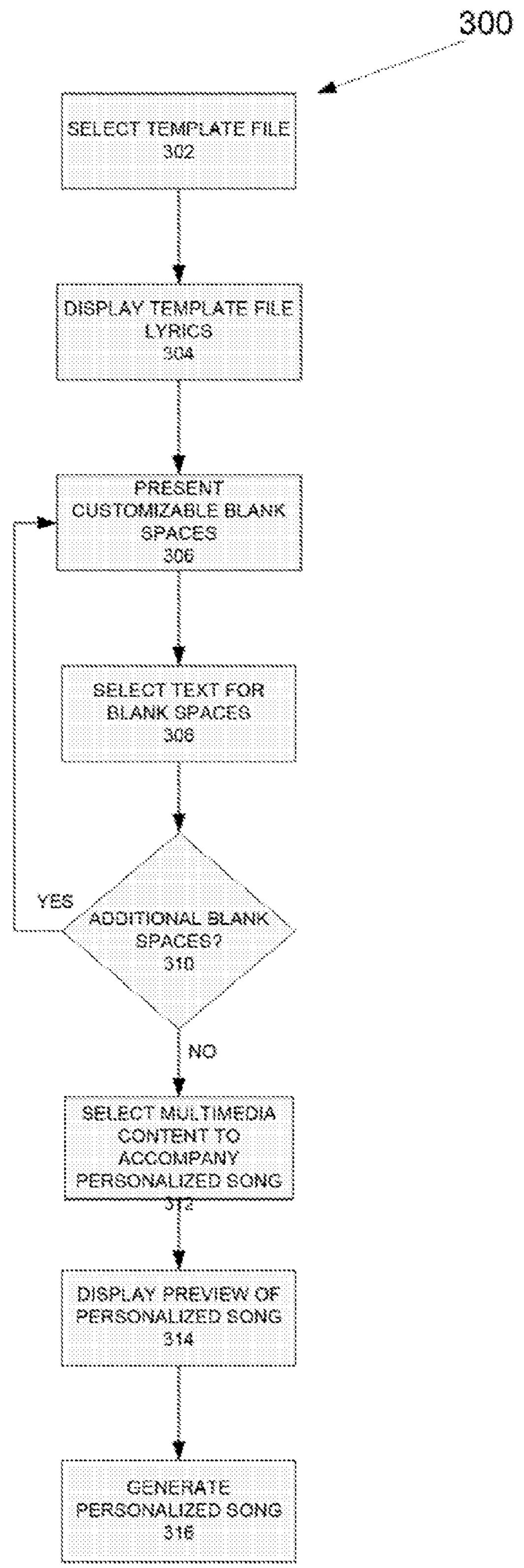
FIG. 3 illustrates a flowchart depicting an exemplary method for creating a personalized song.

FIG. 3 illustrates an exemplary method 300 utilized by the invention for generating personalized songs. The song personalization processing may begin at operation 302 when a desired template file is selected to generate a personalized song. In an embodiment, the user may use a client device 106 to send a request to lyric module 102 to retrieve the desired template file from song repository 103. A user may select a template file which corresponds to a particular occasion, theme, musical genre, artist, album, or any other type of category. At operation 304, the lyrics of the template file can be visually displayed to the user within a user interface of the client device. 106. At operation 306, the song personalization system may then walk the user through the selected template file, displaying the portions of the lyrics which are customizable. For example, the system may display the text of the lyrics to the user and may utilize blank spaces in the text to indicate which portions may be customized. At operation 308, a user can select text to be entered into the blank spaces. In an embodiment, the user may type his or her selected text in the blank spaces. In another embodiment, the user may use a microphone to speak his or her selected text into the blank spaces. At operation 310, the system may move on to each blank space in the set of lyrics until the user enters selected text for each blank space. In an embodiment, the selected text may be associated with the blank spaces by creating a new, user-customized template file.

A user may choose to associate particular multimedia files with specific sections of the template file, or user-customized template file to accompany the personalized song. If so, multimedia data can be selected and associated with designated sections of a song within the template file or user-customized template file at operation 312. At operation 314, the song personalization system may then generate and display a preview version of the personalized song prior to creating the final version of the personalized song. At operation 316, the template file or user-customized template file, along with the selected text and/or the selected multimedia data, can be compiled into a song file that represents the final personalized song. In an embodiment, a user may download the generated personalized song to his or her client device 106.
Alternatively, the song file may be played from a server, or the user may also choose to share the generated song file with others via email messages, mobile messages and/or social network applications.

While particular embodiments of the invention have been illustrated and described in detail herein, it should be understood that various changes and Modifications might be made to the invention without departing from the scope and intent of the invention. The embodiments described herein are intended in all respects to be illustrative rather than restrictive. Alternate embodiments will become apparent to those skilled in the art to which the present invention pertains without departing from its scope.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and subcombinations. This is contemplated and within the scope of the appended claims.

The invention claimed is:

1. A method of creating a personalized song, comprising:
- receiving a template file, the template file including a template of a song with at least one blank space;
- populating the at least one blank space with selected text;
- associating one or more multimedia files with at least one designated section of the song within the template file; and
- receiving a song file that includes a final personalized song, wherein the song file includes the template file compiled with the selected text; and
- playing the final personalized song, wherein the one or more multimedia files are displayed when the designated section of the song is played.

2. The method of claim 1, wherein the song file further includes the one or more multimedia files compiled with the template file and the selected text.

3. The method of claim 1, wherein the template file includes an audio file with at least one of instrumentals and vocals.

4. The method of claim 1, further comprising generating a preview version from the template file and selected text prior to generating the final personalized song.

5. The method of claim 1, wherein the selected text comprises a recording of a user's voice.

6. The method of claim 1, further comprising
- receiving a template file created by a user; and
- uploading the template file created by the user to a data repository.

7. The method of claim 1, further comprising sharing the song file via at least one of an email message, mobile message, and social network application.

8. One or more non-transitory computer-readable media having computer-usable instructions stored thereon for performing a method for generating a personalized song, the method comprising:
- receiving a template file, wherein the template file includes one or blank spaces that have been populated with selected text;
- receiving one or more multimedia files associated with the template file;
- generating a song file that includes a final personalized song by compiling the template file with the one or more multimedia files; and
- playing the final personalized song, wherein the one or more multimedia files are displayed when the designated section of the song is played.

9. The computer-readable medium of claim 8, further comprising playing the generated song file on a server.

10. The computer-readable medium of claim 8, wherein the selected text comprises a recording of a user's voice.

* * * * *